United States Patent [19] [11] 4,407,625
Shum [45] Oct. 4, 1983

[54] MULTI-ARM ROBOT

[75] Inventor: Lanson Y. Shum, Westmoreland County, Salem Township, Pa.

[73] Assignee: Westinghouse Electric Corp., Pittsburgh, Pa.

[21] Appl. No.: 264,154

[22] Filed: May 15, 1981

[51] Int. Cl.³ .............................................. B25J 11/00
[52] U.S. Cl. ................................ 414/728; 74/424.8 R; 414/4; 414/680; 414/732; 414/735; 212/236
[58] Field of Search ............... 414/690, 718, 728, 730, 414/732, 735, 737; 74/522, 525, 424.8; 212/236

[56] References Cited

U.S. PATENT DOCUMENTS

| 2,601,927 | 7/1952 | Frenzel | 212/236 X |
| 3,161,074 | 12/1964 | Korthaus et al. | 74/424.8 |
| 3,268,091 | 8/1966 | Melton | 414/728 |
| 3,779,400 | 12/1973 | Brockman et al. | 414/730 |
| 4,089,233 | 5/1978 | Sebald | 74/424.8 |
| 4,304,519 | 12/1981 | Hubbard | 212/236 X |

FOREIGN PATENT DOCUMENTS

| 2750302 | 5/1979 | Fed. Rep. of Germany | 414/730 |
| 2800273 | 7/1979 | Fed. Rep. of Germany | 414/730 |
| 631329 | 11/1978 | U.S.S.R. | 414/730 X |

Primary Examiner—Robert J. Spar
Assistant Examiner—Terrance L. Siemens
Attorney, Agent, or Firm—E. C. Arenz

[57] ABSTRACT

An automatic robot structure includes a fixed location support 10 which carries three locational arms 12, 14, 16, being hingedly connected to each other at their location of convergence to support a workhead 20, the driving motors 12a, 14a, and 16a each being independently operable to drive its respective arm in an axial direction, each of the arms being rigid in the sense that no part of the arm is hingedly connected to another part, so that the forces derived from a payload weight subject the arms primarily only to compression and or tension.

9 Claims, 10 Drawing Figures

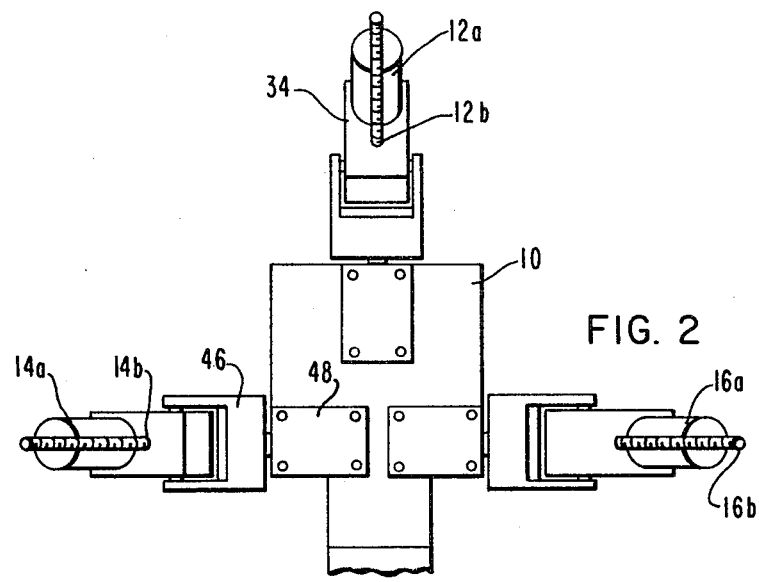
FIG. 2
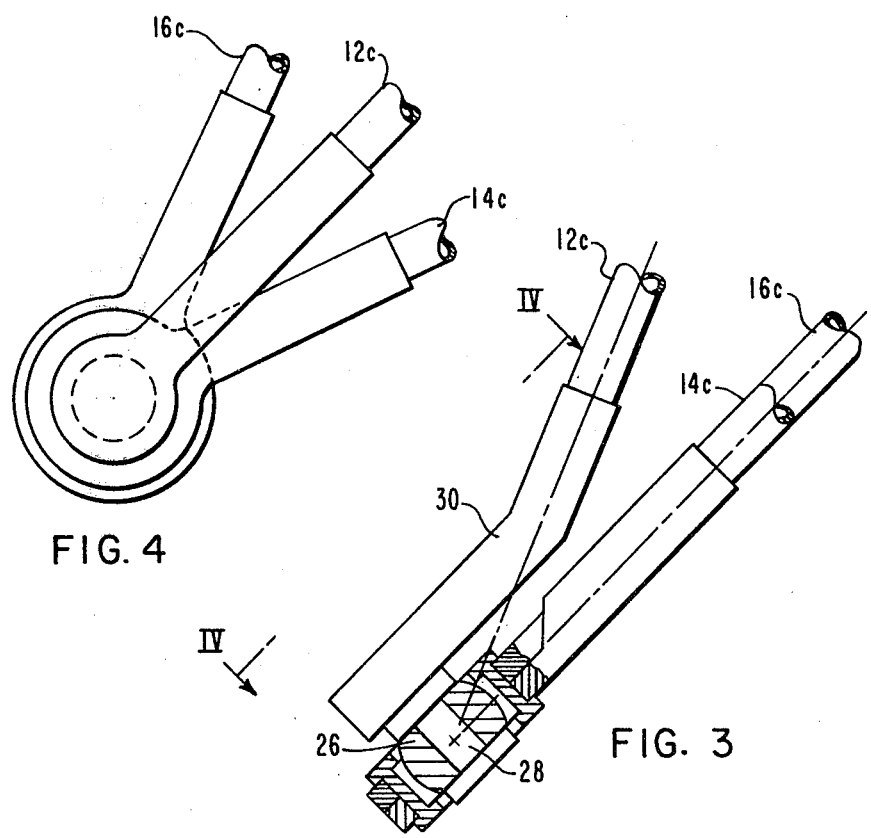
FIG. 4
FIG. 3

MULTI-ARM ROBOT

BACKGROUND OF THE INVENTION

This invention pertains to the art of structural arrangements for a robot of the type which includes a number of independent arms which converge to a workhead end.

Many conventional industrial robots of which I am aware have a general design arrangement in which a vertical post supports a horizontally extending boom or arm having a workhead at the end of the arm. As such, the arm is subject to a bending moment. To resist bending the structural members of the arm are designed with a relatively high degree of rigidity which makes the arm relatively heavy. Accordingly, the structure supporting the arm is relatively heavier. As an example, a robot arm intended to operate with a payload of, say, 100 pounds (45 kg) will have a structure weighing perhaps over 1000 (454 kg) pounds. Thus the arm may have a weight of ten times the payload. Consequently, the motors for operating the conventional robot are necessarily large and are expensive.

It is the aim of my invention to provide an automatic robot structure that incorporates a concept of best use of the theory of strength of materials in a way that the weight to payload ratio is in the order of one to one. Consequently, operating motor sizes can be significantly smaller. Additionally, other advantages flow from the inventive arrangement with respect to speed and accuracy of operation.

SUMMARY OF THE INVENTION

In accordance with one embodiment of the invention the robot includes a support structure with three arms having their remote end portions hingedly connected at a location which is at least relatively close to the point of intersection of the axis of the three arms, this location being adjacent the workhead. The arms have their proximate end portions carried in gimbaled relation from the support structure at spaced apart locations thereat which together define the points of a triangle. The support structure carrying driving means which are fixed in location at the support structure, the driving means serving to drive each arm axially and independently to move the workhead to different positions, and each arm is rigid for its length in the sense that no part of the arm is hingedly connected to another part. Thus the forces derived from the payload weight subjects the arms primarily only to compression and or tension.

BRIEF DESCRIPTION OF THE DRAWINGS

FIG. 2 is a face view of the support end of the robot;

FIG. 3 is a partly broken and fragmentary view, enlarged relative to FIG. 1, of a preferred hinging arrangement at the remote or distal ends of the arms;

FIG. 4 is a face view of the structure shown in FIG. 3;

DESCRIPTION OF THE PREFERRED EMBODIMENT

Figure 1:
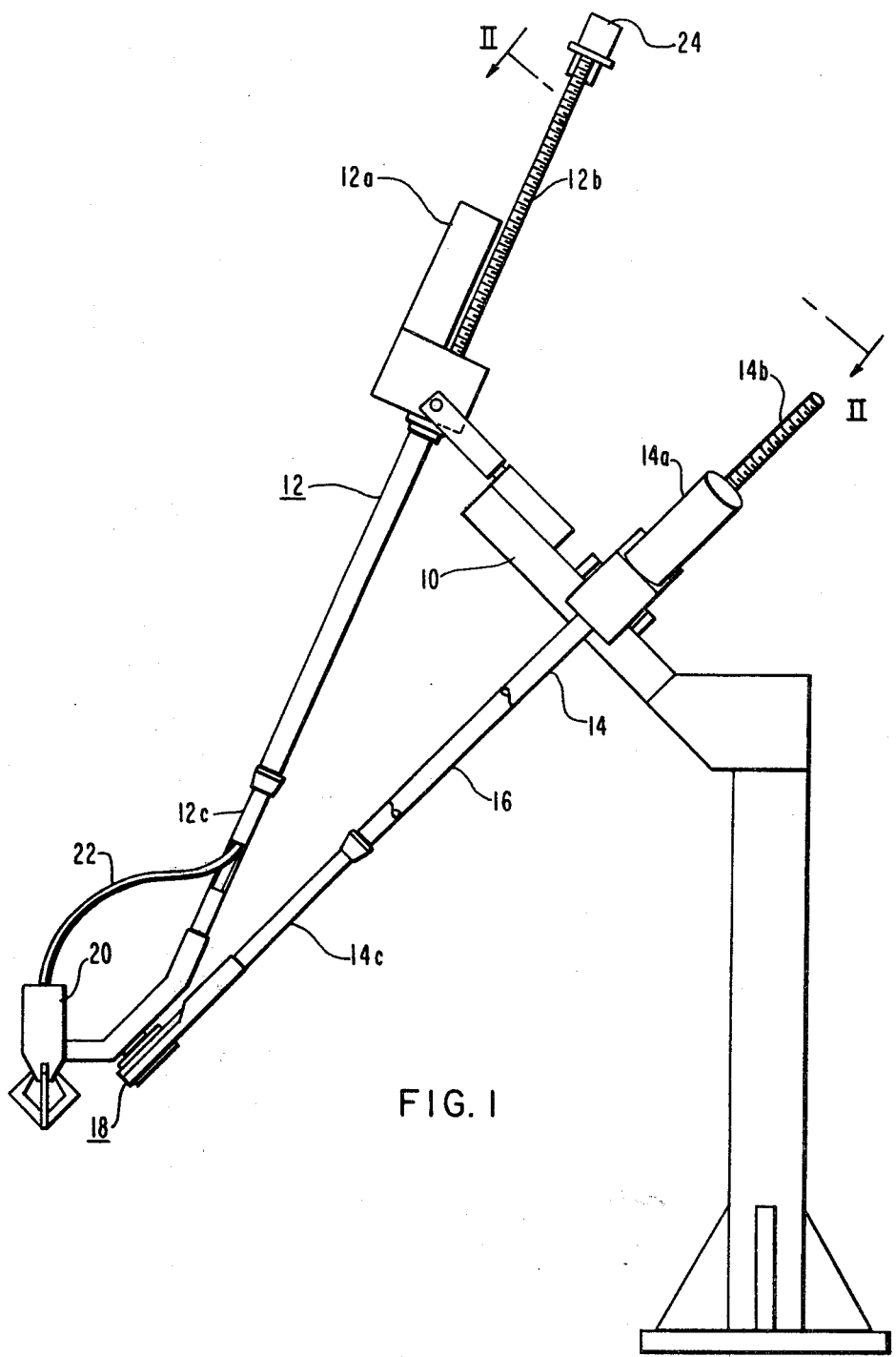
FIG. 1 is an elevation view of a three arm robot according to the invention.

Referring to FIGS. 1 and 2, the basic apparatus includes a support plate 10, three arms 12, 14 and 16, and separate and independent driving means 12a, 14a, and 16a, respectively, each arranged for driving its respective arm axially and independently.

Each arm may be considered to be comprised of a proximate end portion as at 12b, and a remote or distal end portion as at 12c, corresponding letters being applied in FIG. 1 to the corresponding parts of the other two arms. The distal end portions 12c, 14c, and 16c, are hingedly connected together at a location generally designated 18, this location in FIG. 1 being at the point of intersection of the axes of the three arms as will be explained in more detail in connection with FIGS. 3 and 4.

The proximate end portions 12b, 14b, and 16b, are carried from the support structure 10 in gimbaled relation therewith and, as may best be seen in FIG. 2, at spaced apart locations which together define the points of a triangle. One particular arrangement for obtaining the gimbal mountings will be explained in some detail in connection with FIGS. 6 and 7 hereinafter.

A workhead is carried adjacent the hinge connection and may take the form of any of the various devices such as the diagrammatically illustrated gripper 20. In one preferred form of the invention the workhead may have motion imparted to it beyond that of the simple locational motion provided by the three arms, through one or more flexible cables 22 which, in one preferred embodiment, pass into the hollow arms closely adjacent the hinge and extend therethrough to the extreme end of the proximate end of the arms to a device as at 24 for imparting motion to the cable. Thus the workhead may not only be locationally positioned, but may also perhaps be swiveled or tilted depending upon the job requirements of the workhead.

In FIGS. 3 and 4 the currently preferred hinge connection arrangement is illustrated, the essence of this arrangement being that the axes of the three arms meet at a common point which is the center of the hinged connection. As may be thereseen, the two lower arms 14 and 16 are joined in a scissors joint relationship about the spherical bearing 26 while the bearing shaft 28 is fixed to an offset end portion 30 of the extreme distal end of the arm 12. The intersection of the axes of the arms at the center of the bearing is illustrated by the center lines. As should be apparent from the drawing, each of the arms may be angularly displaced with respect to each other arm through the axial movement of the various arms.

Figure 5:
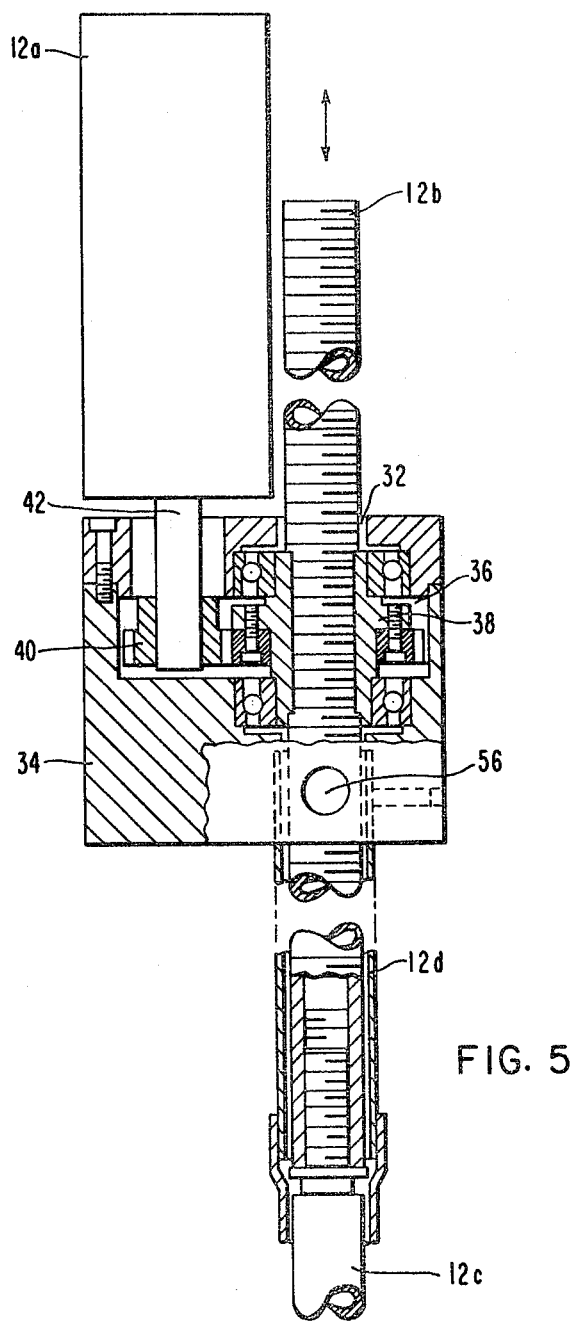
FIG. 5 is a partly broken and fragmentary view in vertical cross-section of the arrangement for driving one arm.

One example of a drive arrangement for a given arm, in this example the arm being 12, is illustrated in FIG. 5. The proximate end portion of the arm comprises the exteriorly threaded screw 12c which extends through an opening 32 in the drive block 34. The drive block includes an interior chamber 36 in which an interiorly threaded gear 38 is situate with its teeth meshing with the exterior threads of the distal end portion 12c. The gear 38 is in turn driven by gear 40 fixed to the shaft 42 of a servomotor 12a. In another form of drive arrangement the driving gear 38 is replaced by a recirculating ball nut in an arrangement generally similar to that shown in U.S. Pat. No. 3,161,074.

Details of the rigid joint between the proximate and distal ends of an arm may also be seen in FIG. 5. The upper end of the distal portion 12c is turned into the lower end of the proximate portion 12b. A dust cover in the form of an outer tube 12d can receive the distal portion in telescopic relation. In some cases it may be desirable to use an extendible-retractable flexible cover.

As currently contemplated, in the preferred embodiment the motors are preferably provided with an integral tachometer and an encoder or resolver. The pitch of the lead screw and the encoder or resolver are chosen to suit the particular application. As an example, a five pitch per inch lead screw and a 200 pulse per revolution encoder will have a resolution of 0.001 in. (2.54 E-5 m) on axial movement of the lead screw. A 1000 pulse per revolution encoder will increase the resolution five times for accurate assembly work. A typical moderate motor speed of 2000 rpm will result in axial movement at the rate of 400 inches (10.16 m) per minute. At a subtended angle of 30° between lead screws, the lateral speed is about four times the lead screw axial speed, while the resolution is four times worse than the axial resolution. In other words, if the lead screw resolution is 0.001 inch (2.54 E-5 m) the lateral resolution is 0.004 inch (1.016 E-4 m) which is a value which is acceptable for many industrial applications.

Figure 6:
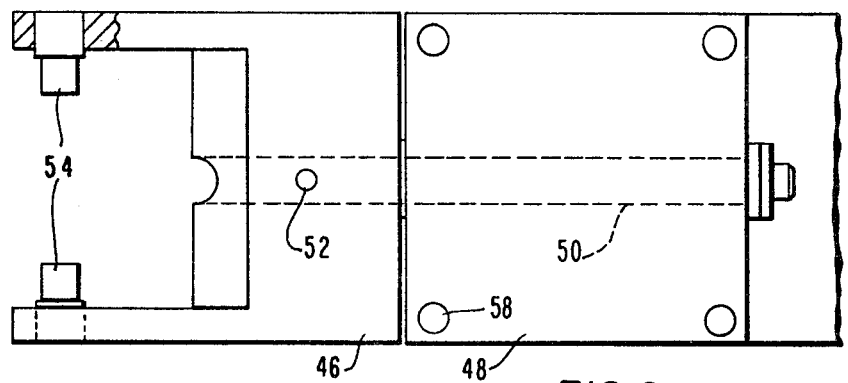
FIG. 6 is a plan view of one form of a gimbaling bracket structure.
Figure 7:
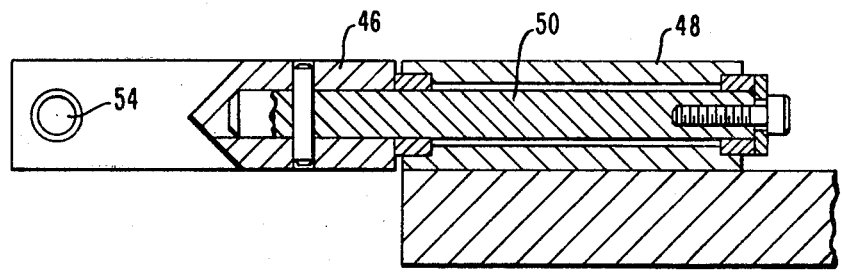
FIG. 7 is an elevation view of the bracket of FIG. 6.

Referring now to FIGS. 6 and 7, one form of arrangement for mounting the block 34 in gimbaled relation from the support plate 10 is shown. A yoke member 46 is supported from block 48 by a pin 50 in aligned bores of the two members. The pin is fixed as at 52 to the yoke member 46 and is free to rotate in the bore of the block 48 so that the yoke can rotate in one plane normal to the axis of the pin. The arms of the yoke are provided with inwardly projecting axles 54 which, in the assembly of the drive block 34 to the yoke, project into oppositely disposed bores 56 (FIG. 5) to journal the drive block for rotation in another plane parallel to the axis of the pin. The block 48 in turn is affixed to the support plate 10 (FIG. 2) by fasteners through the four corner holes 58 in the block 48. From the foregoing it will be appreciated that the arms as so supported are free to move to various angular dispositions within the range of limits of the mechanism.

Figure 8:
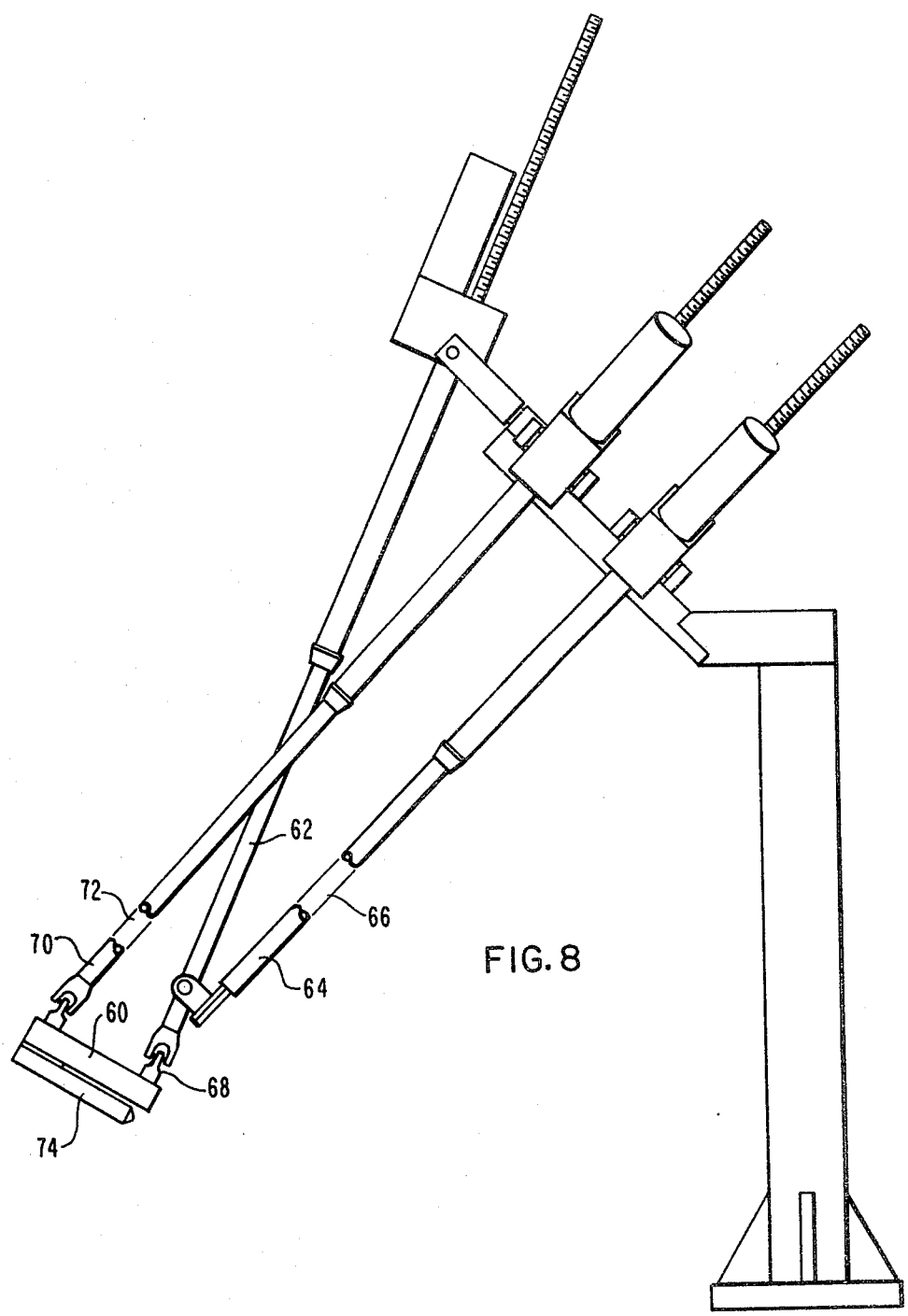
FIG. 8 is an elevation view of an embodiment of the invention in which five arms are used, and the hinged connection arrangement of the three arms is different from that shown in FIGS. 1-4.

Turning now to FIG. 8, a five arm robotic manipulator is illustrated. Basically the same three arm arrangement as in FIG. 1 is used to positionally locate the workhead plate 60 while the two additional arms are used to tilt the workhead plate 60 around a horizontal axis passing through the joint between the workhead and locational arms or to swivel it about an axis at a right angle thereto.

The arms 62, 64 and 66 correspond to the three locating arms 12–16 of FIG. 1, the arms 64 and 66 being those which are joined in a scissors joint relationship. It is noted that the hinged joint of the three arms at 68 does not correspond with the joint 18 of FIG. 1, the joint 68 resulting in there being a small offset from the location where the axes of the three arms meet and the location of the hinged joint. This is considered to be slightly less preferable than an arrangement as shown in FIG. 1 since, to the degree the intersection of the axes of the arms is displaced from the hinged joint, there is a corresponding increase in the degree to which a bending movement can be imposed upon the arm having its axis missing the joint. However, for many purposes the illustrated joint arrangement is entirely adequate. The two additional arms 70 and 72 are connected to the work head plate 60 in rotating and pivotal fashion near one and the other opposite top corners of the plate 60. In other respects the arms and their respective drive means are essentially the same as those described in FIG. 1.

The working device schematically shown in FIG. 8 and mounted to the workhead plate 60 is intended to represent a welding device 74 which can conveniently be manipulated by a robot that is shown in FIG. 8 in view of requirements at times to not only properly locate and move the welding head but also to tilt it.

Figure 9:
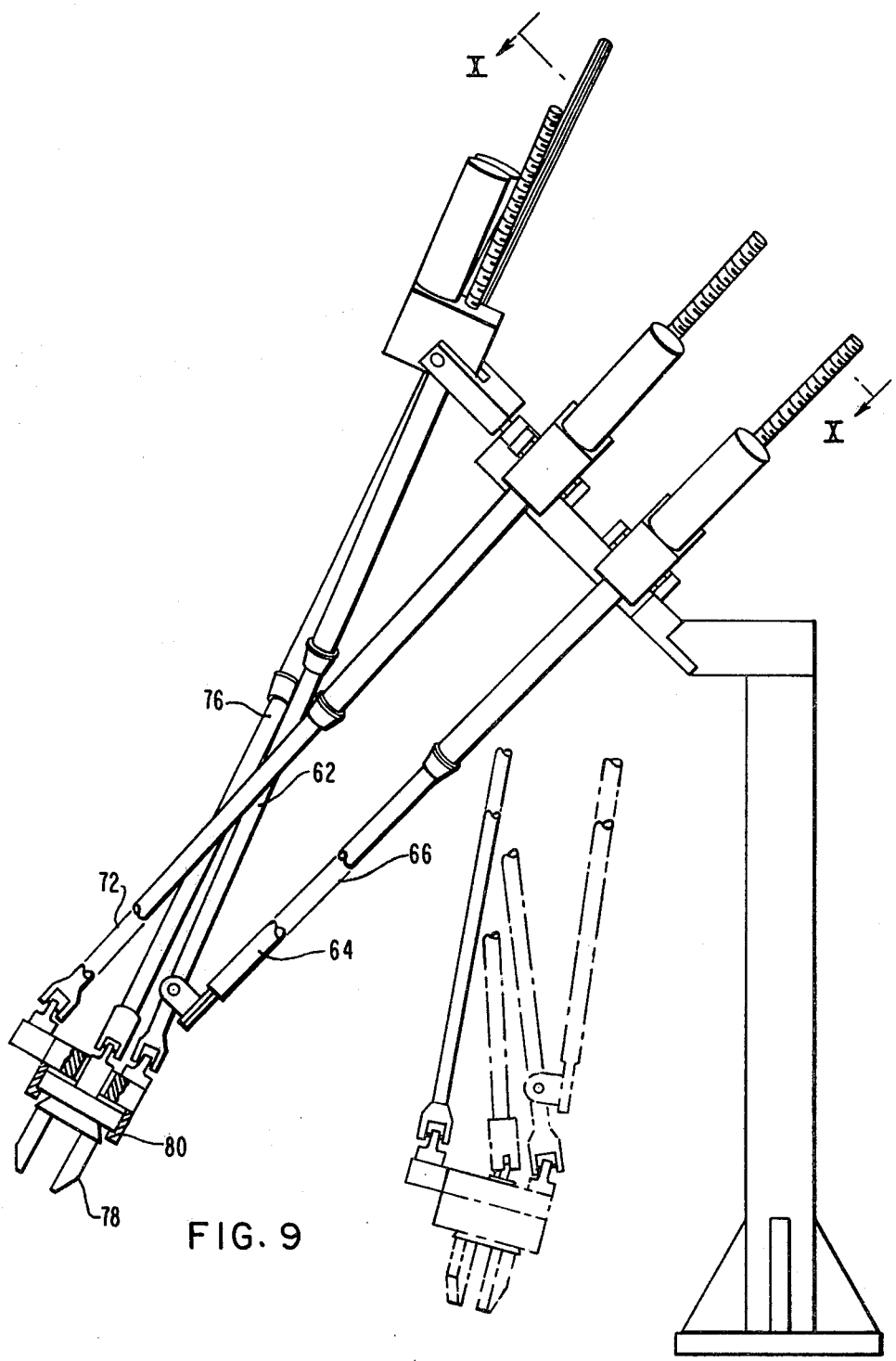
FIG. 9 is an elevation view of a six arm robot in both a solid line and a dash line position.

FIG. 9 illustrates an arrangement in which a manipulator is not only furnished with the five, axially movable arms, but additionally is provided with a sixth drive element for effecting a swivel about an axis normal to the plane of the workplate. In FIG. 9 the arms corresponding to those of FIG. 8 are identically numbered with the sixth drive element being identified by numeral 76. In the illustration the work device is a gripper 78 which is carried for rotation within workhead 80 through a bearing arrangement. The sixth element 76 is connected to the gripper 78 through the workhead so that rotation of the element 76 will result in rotation of the gripper 78 about its center axis. As with the manipulator of FIG. 8, the three arms 62, 64 and 66 control the locational position of the workhead, with the two arms 70 and 72 providing for movement in a tilting position about one axis and a swiveling movement about another axis. In FIG. 9, the dashed line representation of the movable parts of the robot is intended to illustrate one of many other positions to which it may be moved.

Figure 10:
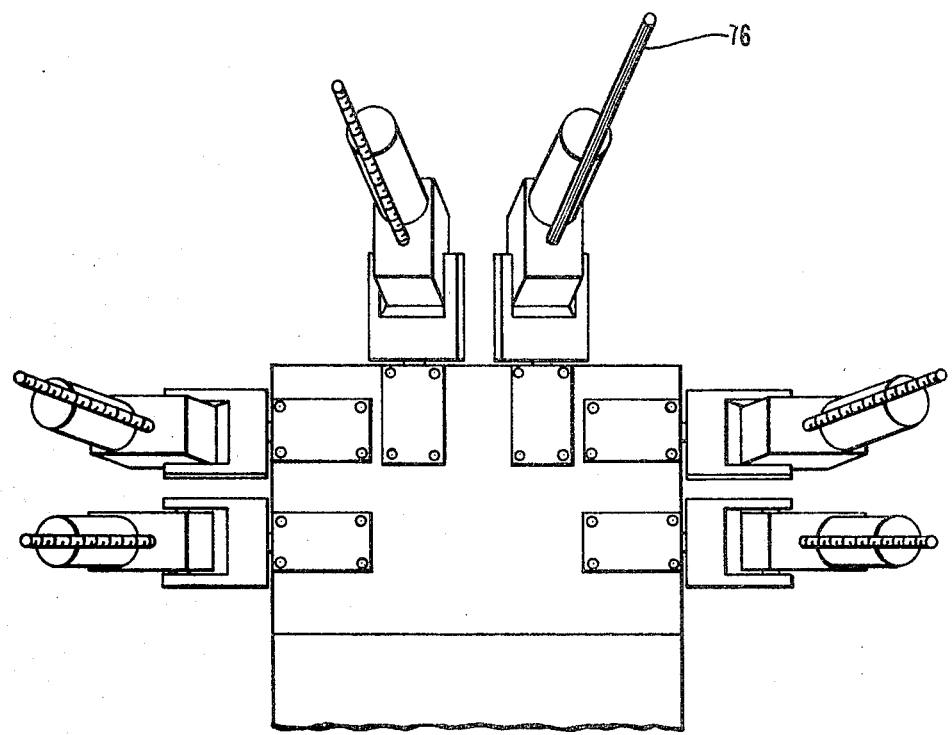
FIG. 10 is a face of the support end of the FIG. 9 device.

It will be seen in the FIGS. 9 and 10 views of the six arm device that the proximate end portion of the sixth arm 76 has longitudinally extending exterior splines, rather than helical threads as do the other arms. An interiorly splined nut in the drive permits the splined rod to move axially to accommodate the changing position of the workhead by the axial movement of the other arms, and by rotating the interiorly splined nut as called for to rotate the gripper.

In the operation of any of the devices illustrated as different embodiments of the invention, it will be appreciated that the drive motors are programmed or otherwise controlled in accordance with the particular application in which the automatic robot is employed. Regardless of the form however, it will be appreciated that there are numerous advantages associated with the inventive robot as contrasted to the conventional robots. The driving means for various arms is supported by the support plate so that the arms themselves are essentially the only moving parts of the structure and accordingly the moving structure is relatively light weight. There is very little bending moment in the structure, so that the forces which derive from the payload weight and workhead movement subject the arms primarily only to compression and/or tension. With the driving means being located remotely on the stationary support part of the device, they are away from any hostile environment in which the workhead may be required to intrude. Since the arrangement is essentially the same regardless of size, the device can be scaled up or down over a wide range of payload, working space, and performance capabilities.

I claim:

1. A robotic manipulator for automatically positioning a workhead comprising:

a support structure;

three arms having their remote end portions hingedly connected together at a single location which is at least relatively close to the point of intersection of the axes of the three arms, said location being adjacent the workhead connected to said three arms, and having their proximate end portions carried in gimbaled relation from said support structure at spaced apart locations thereat together defining the points of a triangle;

means for driving each arm axially and independently to move said workhead to different positions, said driving means being carried by said support structure and being fixed in location at said support structures, said workhead being in rigid relation to one of said three arms and spaced from said single location;

each arm being substantially straight from its remote end portion to its proximate end portion and rigid for its length in the sense that no part of the arm is hingedly connected to another part so that the forces derived from the payload weight and movement subject said arms primarily only to compression and/or tension.

2. A manipulator according to claim 1 wherein:

said proximate end portion of each said arm comprises an exteriorly-threaded element and, said driving means for each said arm includes electrically driven means rotating on said threaded element to move said arm axially without rotation of said arm.

3. A manipulator according to claim 2 wherein:

at least said threaded end portions are hollow to minimize the weight of each said arm.

4. A robotic manipulator for automatically positioning a workhead comprising:

a support structure;

three arms having their remote end portions hingedly connected together at a single location which is at least relatively close to the point of intersection of the axes of the three arms, said location being adjacent the workhead connected to said three arms, and having their proximate end portions carried in gimbaled relation from said support structure at spaced apart locations thereat together defining the points of a triangle;

means for driving each arm axially and independently to move said workhead to different locations, said driving means being carried by said support structure and being fixed in location at said support structure;

each arm being substantially straight from its remote end portion to its proximate end portion and rigid for its length in the sense that no part of the arm is hingedly connected to another part so that the forces derived from the payload weight and movement subject said arms primarily only to compression and/or tension;

at least one additional arm of the same character as the other three arms and having a support and drive arrangement corresponding to the arms, the remote end of said at least one additional arm being hingedly connected to said workhead at a location apart from the connection location of said other arms to said workhead so as to permit attitude positioning of said location positioning effected by said other three arms.

5. A robotic manipulator for automatically positioning a workhead comprising:

a support structure;

three arms having their remote end portions hingedly connected together at a single location which is at least relatively close to the point of intersection of the axes of the three arms, said location being adjacent the workhead connected to said three arms, and having their proximate end portions carried in gimbaled relation from said support structure at spaced apart locations thereat together defining the points of a triangle;

means for driving each arm axially and independently to move said workhead to different locations, said driving means being carried by said support structure and being fixed in location at said support structure;

each arm being substantially straight from its remote end portion to its proximate end portion and rigid for its length in the sense that no part of the arm is hingedly connected to another part so that the forces derived from the payload weight and movement subject said arms primarily only to compression and/or tension;

a fourth arm and a fifth arm, both of the same character as the other three arms and having support and drive arrangements corresponding to the other three arms, the remote ends of both said fourth and fifth arms being hingedly connected to said workhead at locations spaced apart from each other, and spaced apart from the connection location of said other arms to said workhead, so as to permit attitude positioning of said workhead independently of said locational positioning effected by said other three arms.

6. A manipulator according to claim 5 wherein:

said connection locations to said workhead form a triangle in which the three arm connection is vertically spaced from the connection location of said fourth and said fifth arms, so that movement of said fourth and fifth arms axially together effects a tilting movement of said workhead about one axis and differential axial movement between said fourth and fifth arms effects swiveling of said workhead about another axis.

7. A manipulator according to claim 5 including a sixth element extending from said support structure to said workhead and being rotatable to rotate a working device carried by said workhead about a third axis normal to the axes of tilt and swivel.

8. A robotic manipulator for automatically positioning a workhead comprising:

a support structure;

three arms having their remote end portions hingedly connected together at a single location which is at least relatively close to the point of intersection of the axes of the three arms, said location being adjacent the workhead connected to said three arms, and having their proximate end portions carried in gimbaled relation from said support structure at spaced apart locations thereat together defining the points of a triangle;

means for deriving each arm axially and independently to move said workhead to different locations, said driving means being carried by said support structure and being fixed in location at said support structure;

each arm being substantially straight from its remote end portion to its proximate end portion and rigid for its length in the sense that no part of the arm is hingedly connected to another part so that the forces derived from the payload weight and movement subject said arms primarily only to compression and/or tension;

said proximate end portion of each said arm comprises an exteriorly-threaded element and, said driving means for each said arm includes electrically driven means rotating on said threaded element to move said arm axially without rotation of said arm;

at least said threaded end portions are hollow;

said arms are hollow for their length to an opening located at a point relatively close to said hinge location; and workhead driving means extending through at least one of said hollow arms and connected to said workhead.

9. A manipulator according to claim 8 wherein:

said workhead driving means comprises a rotatable element.

* * * * *